Figure 1:
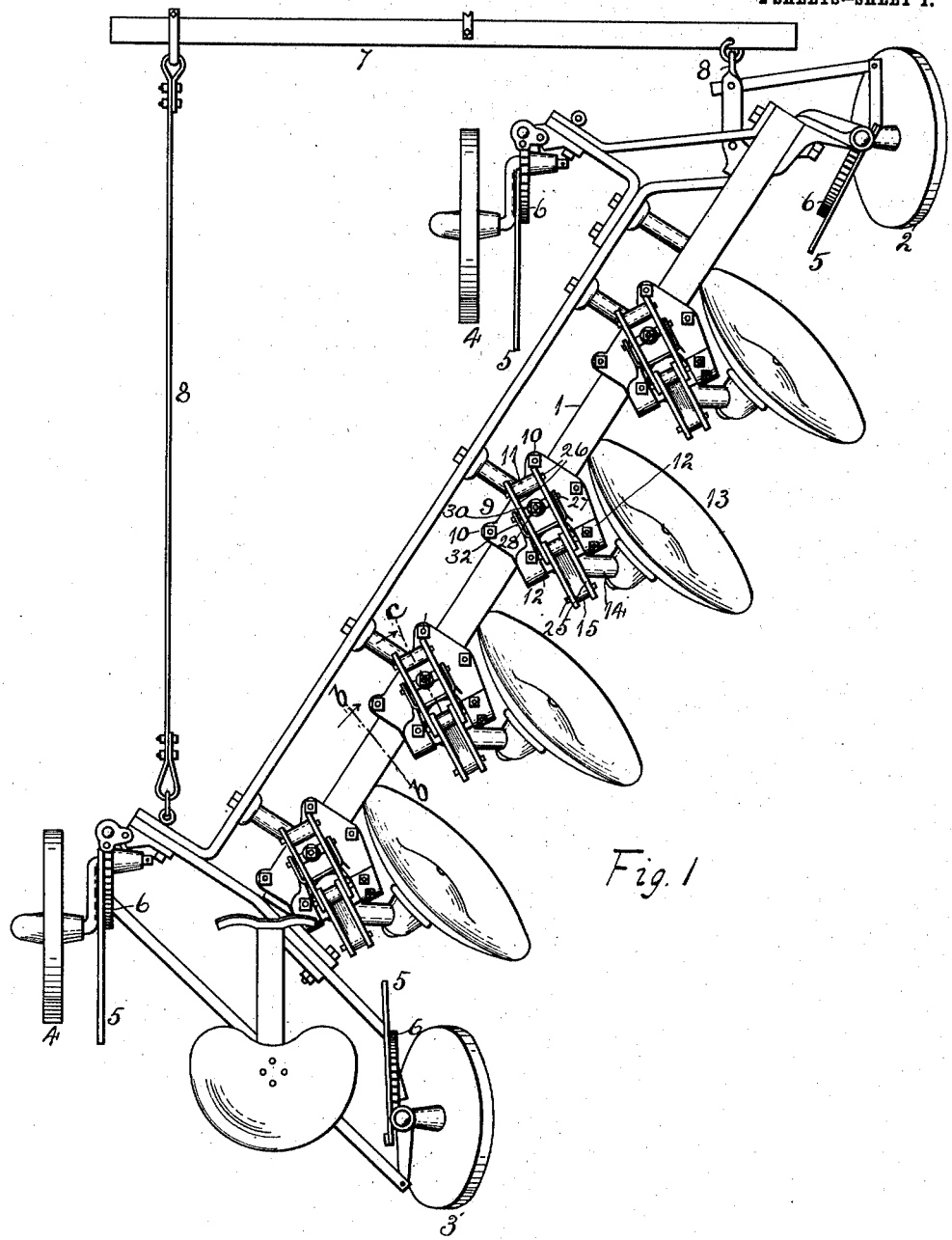

L. E. WATERMAN.
WHEELED PLOW.
APPLICATION FILED AUG. 17, 1908.
967,093.
Patented Aug. 9, 1910.
2 SHEETS—SHEET 2.
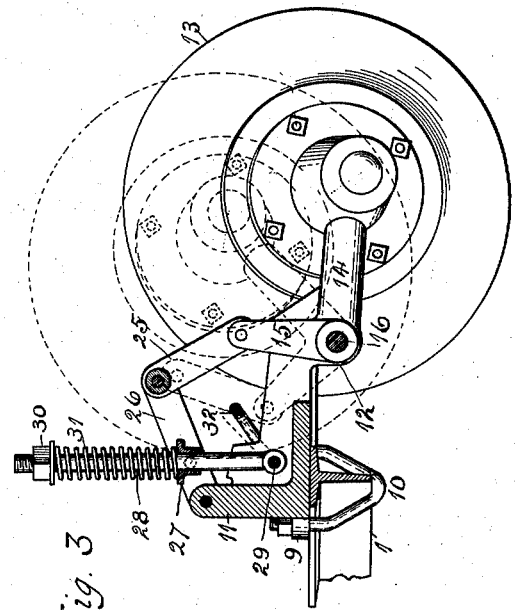
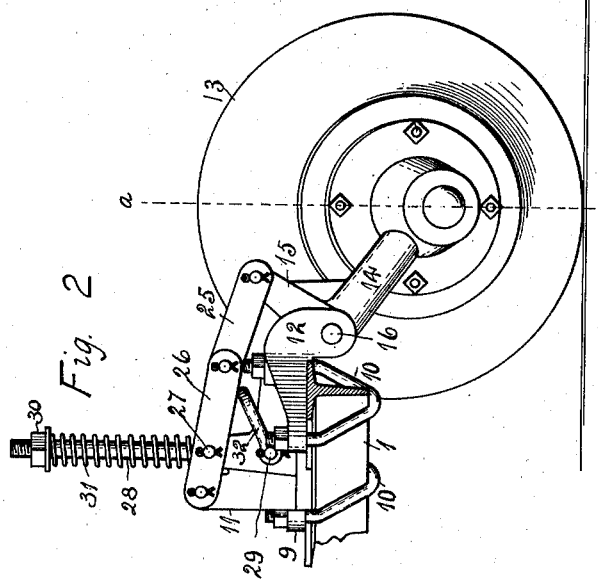
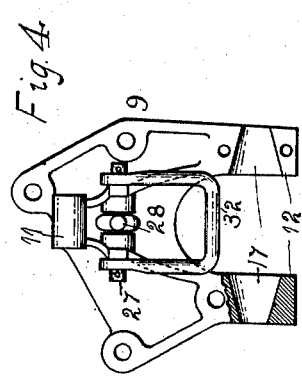
Witnesses:
J. S. Clark
E. Behel
Inventor:
Lewis E. Waterman
By A. O. Behel
Atty.

UNITED STATES PATENT OFFICE.

LEWIS E. WATERMAN, OF ROCKFORD, ILLINOIS, ASSIGNOR TO EMERSON-BRANTINGHAM CO., OF ROCKFORD, ILLINOIS, A CORPORATION OF ILLINOIS.

WHEELED PLOW.

967,093.  Specification of Letters Patent.  Patented Aug. 9, 1910.

Application filed August 17, 1908. Serial No. 448,871.

*To all whom it may concern:*

Be it known that I, LEWIS E. WATERMAN, a citizen of the United States, residing at Rockford, in the county of Winnebago and State of Illinois, have invented certain new and useful Improvements in Wheeled Plows, of which the following is a specification.

The object of this invention is to support a plowing disk in a manner to permit it to raise when it strikes an obstruction, and applied spring force to return it and hold it in its working position.

The further object of this invention is to construct a plowing disk with a depressed center, and to the rear face of the disk is connected the bearing for the disk, thereby utilizing the proper length of bearing without it projecting beyond the cutting edge of the disk.

In the accompanying drawings, Figure 1 is a plan view of a wheeled plow containing my improvements. Fig. 2 is a cross section of the main frame showing one of the plowing disks and its connections therewith on dotted lines $b$ $b$ Fig. 1. Fig. 3 is a cross section of the main frame, and through the support for a plowing disk on dotted line $c$ Fig. 1. Fig. 4 is a plan view of the bracket support for a plowing disk, in which a portion of one bearing is in section.

The main frame 1 is supported by the front furrow wheel 2, rear furrow wheel 3 and land wheels 4. Each of the wheels is provided with a lever 5, and a toothed segment 6 for regulating the height of the frame. A draft bar 7 has connections 8 with the main frame.

The main frame 1 supports a plurality of plowing disks, and a description of one will answer. A bracket 9 is connected to the main frame by the U bolts 10, and is provided with an uprising projection 11 and two rearwardly extending branches 12. The support for the plowing disk 13 is composed of the arms 14 and 15 in bell-crank form, and the cross bar 16 supported by the bearings 17 formed in the branches 12. To the free end of the arm 15 are pivoted two links 25, and to the free ends of these links are pivotally connected two links 26 which have their free ends pivotally connected to the uprising projection 11. A cross-bar 27 connects the two links 26, and through it passes a rod 28 having its lower end connected to the bracket 9 by the pin 29. The upper portion of this rod is screw-threaded and receives a nut 30 on its screw-threaded portion. A coiled spring 31 surrounds the rod 28 between the nut 30 and the cross-bar 27. To the bracket 29 is connected a stop 32 against which the links 25 will strike when the plowing disk is raised, and prevent too great a lock of the links.

In use should the plowing disk 13 strike an obstruction, it will yield upwardly into the position shown in dotted lines Fig. 3, and this upward action will be against the action of the spring 31. The weight of the plowing disk will cause the disk to drop into working position, and the downward force exerted by the spring 31 will hold the plowing disk yieldingly to its work.

I claim as my invention.

1. In a plow, the combination with a beam, of a bracket resting on the beam, U-shaped clips connecting the bracket to the beam, a plowing member pivoted to the beam and having an upstanding arm, an uprising projection on the bracket between the clips, toggle links pivoted to the upstanding projection and to the arm of the plowing member, a rod pivoted to the bracket adjacent to the uprising projection and extending transversely of one of the links, a cross bar pivoted to said link and sliding on the rod, and a spring mounted on the rod above the cross bar and bearing downwardly against said cross bar.

2. In a plow, the combination with a support, of an upwardly swinging plowing device pivoted thereto, means for yieldingly resisting the upward movement of the device, a mounting for the yielding means, a stop for limiting the swinging movement of the plowing device, and common means for securing the stop and mounting to the support.

3. In a plow, the combination with a supporting bracket, of a plowing device pivoted thereto, toggle links connecting the device and bracket, a spring bearing against the toggle links, a mounting for the spring, a pivotal connection between the mounting and the bracket, and a stop yoke mounted on said pivotal connection and disposed in the path of the toggle links for limiting the swinging movement of the plowing device.

In testimony whereof I have hereunto set my hand in presence of two subscribing witnesses.

LEWIS E. WATERMAN.

Witnesses:
A. O. BEHEL,
E. D. E. N. BEHEL.